Dec. 25, 1962    J. W. CHINN    3,069,714
MANUAL SCRAPING TOOL
Filed June 19, 1961
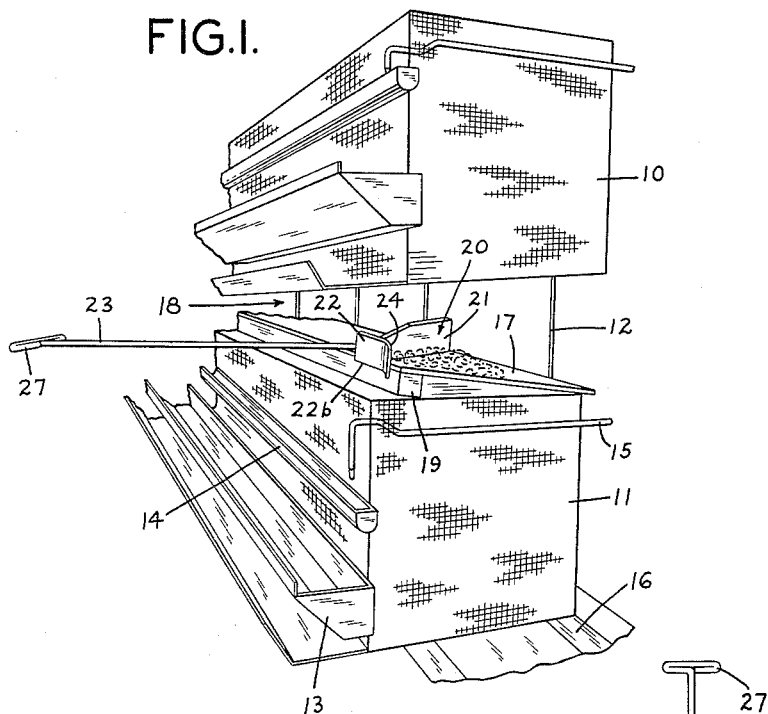
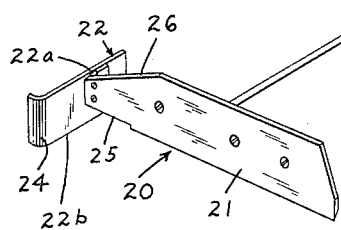
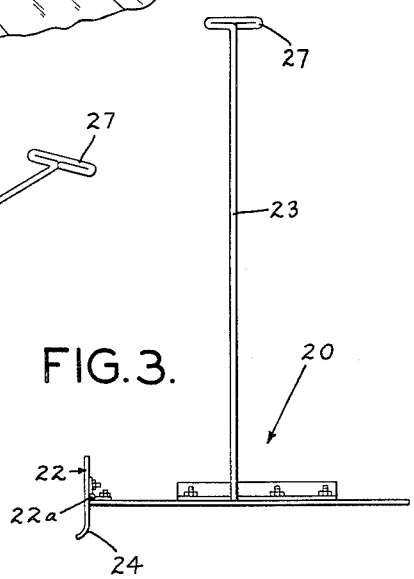
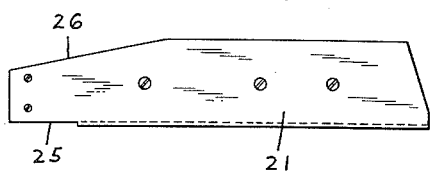
INVENTOR
JOHN W. CHINN
John W. Chinn United States Patent Office 3,069,714
Patented Dec. 25, 1962

3,069,714
MANUAL SCRAPING TOOL
John W. Chinn, Hague, Va.
Filed June 19, 1961, Ser. No. 118,051
4 Claims. (Cl. 15—236)

This invention relates to a manually operated tool and more particularly to a manual scraping tool for use in removal of debris in poultry houses.

In certain types of modern poultry houses the fowls are kept in wire mesh cages arranged side by side in horizontal rows, two rows constituting a tier, spaced one above the other and vertically separated by spaces of the order of 3 to 6 inches deep. The lower row of cages of each tier is covered by an element known as a dropping board, for the catching of droppings and debris from the row of cages above.

In the interest of sanitation it is necessary to scrape the dropping boards regularly to remove refuse therefrom. Owing to the location of the boards and the dimensions of the spaces in which they are located, performance of the scraping operation is awkward, tiresome, and unpleasant.

It is an object of this invention to provide a manual tool of simple, rugged construction which may be utilized to carry out the scraping operation more easily and efficiently and with less fatigue than has heretofore been possible. Other objects and advantages will appear from the following description.

A preferred embodiment of the invention is illustrated in the accompanying drawing in which, FIGURE 1 is a view illustrating use of the invention for cleaning a dropping board in a chicken house;

FIGURE 2 is a perspective view illustrating the invention from the front;

FIGURE 3 is a top plan view of the invention; and

FIGURE 4 is a detail view showing the scraper blade from the front.

In FIGURE 1, upper and lower rows of cages are designated respectively by numerals 10 and 11. The cages are of wire mesh construction and are supported in a conventional manner by a series of supports one of which is indicated at 12. Each row of cages is equipped with a trough 13 for poultry feed and a water trough 14 supplied from pipe 15. The cages are provided with suitable openings, not shown, for the heads and necks of the poultry in the cages so that the fowls have continual access to the feed and water troughs in a manner well known in the art.

As appears from FIGURE 1, the cages are of wire mesh construction so that droppings and refuse are permitted to fall from the cages. The debris from the lower cages falls directly into pit 16 from which it is cleaned from time to time. In order to prevent dropping from row 10 from entering the lower cages, the upper surface of the lower cages is covered by a dropping board 17 which may be about 16 inches wide. As shown, board 17 may be usported in a rearwardly, downwardly inclined manner, being nailed near its front edge to wooden member 19. It is customary to scrape the refuse from boards 17 into pit 16 from which it is removed as required by sanitary considerations.

Owing to the dimensions and location of the spaces 18 between the upper row of cages 10 and boards 17, scraping the boards has heretofore been an awkward, arduous task. The foregoing construction of poultry houses is of conventional well-known design.

The structure of the scraper of this invention is illustrated in FIGURES 2, 3, and 4 of the drawing. As there shown, the scraper 20 is constituted of a generally vertically extending scraper 21 having a beveled lower scraping edge, a generally vertically extending guide 22 pivotally secured intermediate its ends to one end of blade 21 at 22a and a generally horizontally extending handle 23. Guide 22 extends appreciably, for example about 1 inch, below the lower edge of scraper blade 21 as indicated at 22b and this portion 22b slides along the forward edge of board 17 in a manner which will be clear hereinafter. The forward edge of guide 22 is curved or beveled as shown at 24 to permit it to pass readily over any irregularities along the front edge of board 17 without snagging or interruptions.

Blade 21 has a cutout at 25 to facilitate passage of blade over nailheads securing board 17 to wooden member 19. Top of blade 21 is tapered at 26 toward guide 22 in order to permit it to pass readily between the top cages and board 17.

Handle 23 is rigidly secured to blade 21 in any suitable manner, for example its inner end may be welded to an angle iron bolted to the blade as shown on the drawing or may be threaded so as to be received by a threaded aperture in the blade, or the two parts may be welded directly together. The outer end of the handle is provided with a knob 27 to be grasped by the operative in use.

The parts are suitably of metal, for example steel and of the following approximate dimensions: The blade may conveniently be of modified rectangular shape as shown and of a length greater than the width of board 17, for example about 18 to 22 inches long, and a height such as to readily enter spaces 18. Handle 23 may be about 30 to 36 inches long and guide 22 is shorter than blade 21, for example 3 to 6 inches long.

The scraper is used as shown in FIGURE 1. An operative grasps the knob 27 with the right hand and the shaft of handle 23 with the left hand with the blade 21 resting on the upper surface of board 17 and the portion 22b of guide 22 resting against the front edge of the board. The blade is held at an angle to the edges of the board so as to impel movement of the debris down the inclined surface of the board over its rear edge into the pit 16 below. Simple forward movement of the operative holding the scraper in this position easily effects removal of the debris from the boards. The guide 22 extends along the front edge of board 17, the portion 22b riding along the edge and the remainder extending above the upper surface of the board and preventing the debris near the front edge from being pushed over this edge. The hinged joint 22a permits the operative to manipulate the scraper blade at varying angles to board 17 and to work around supports 12 while maintaining guide 22 in contact with the front edge of the board.

What is claimed as new is:

1. A manual scraping tool comprising a scraper blade having a substantially straight lower edge adapted to engage a surface to be scraped, a guide member pivotally attached to said blade adjacent an end thereof and extending downwardly below the lower edge thereof, said guide being adapted to engage an edge of the surface to be scraped, and a handle rigidly attached to and extending rearwardly from said scraper blade.

2. A manual scraping tool adapted for use in scraping the dropping boards disposed in spaces between vertically spaced rows of poultry cages comprising a scraper blade having a lower edge adapted to engage the upper surface of the board to be scraped, the blade having a forward face extending generally upwardly from said surface, a guide pivotally attached intermediate its ends to one end of the scraper blade and extending both below and above the lower edge of the blade, the portion of the guide extending below the lower edge being adapted to slide along an edge of the board and to maintain the scraper blade in scraping position on the board between vertically spaced rows of poultry cages, and a rigid handle rigidly attached to said blade intermediate the ends thereof and extending laterally therefrom in a generally horizontal direction, said scraper blade, guide and handle constituting a unitary manual tool adapted to be inserted in the said spaces with the handle projecting therefrom in position to be grasped and operated.

3. A manual scraping tool as defined in claim 2 in which the forward end of the guide is curved.

4. A manual scraping tool as defined in claim 2 in which a portion of the lower edge of the scraper blade adjacent the guide is cut away so as to permit the blade to pass readily over the heads of nails securing the dropping boards in position.

References Cited in the file of this patent

UNITED STATES PATENTS

| | | |
|---|---|---|
| 2,109,635 | Ferris | Mar. 1, 1938 |
| 2,264,939 | Hawkins | Dec. 2, 1941 |
| 2,961,683 | Meyer | Nov. 29, 1960 |